(12) United States Patent
Blaumeiser et al.

(10) Patent No.: US 8,570,022 B2
(45) Date of Patent: Oct. 29, 2013

(54) MULTIPHASE DC TO DC VOLTAGE CONVERTER

(75) Inventors: Boris Blaumeiser, Zurich (CH); Dirk Kranzer, Breisach (DE); Markus Konzili, Kappelrodeck (DE)

(73) Assignee: Robert Bosch GmbH, Stuttgart (DE)

(*) Notice: Subject to any disclaimer, the term of this patent is extended or adjusted under 35 U.S.C. 154(b) by 789 days.

(21) Appl. No.: 12/673,949

(22) PCT Filed: Sep. 5, 2008

(86) PCT No.: PCT/EP2008/061799
§ 371 (c)(1),
(2), (4) Date: Feb. 17, 2010

(87) PCT Pub. No.: WO2009/037135
PCT Pub. Date: Mar. 26, 2009

(65) Prior Publication Data
US 2011/0043173 A1    Feb. 24, 2011

(30) Foreign Application Priority Data
Sep. 13, 2007  (DE) .................. 10 2007 043 603

(51) Int. Cl.
  H01F 33/00   (2006.01)
  H02M 7/00    (2006.01)
  G05F 1/12    (2006.01)

(52) U.S. Cl.
  USPC .............. 323/361; 323/362; 323/247; 363/65

(58) Field of Classification Search
  USPC ......... 323/271, 272, 285, 355, 358, 361–365, 323/368, 247–250; 363/65–72
  See application file for complete search history.

(56) References Cited

U.S. PATENT DOCUMENTS

| | | | | |
|---|---|---|---|---|
| 6,980,077 | B1* | 12/2005 | Chandrasekaran et al. | .. 336/212 |
| 6,984,964 | B2* | 1/2006 | Chang | ............ 323/207 |
| 7,009,370 | B2* | 3/2006 | Deaton | ............ 323/272 |
| 2002/0118000 | A1* | 8/2002 | Xu et al. | ........... 323/259 |
| 2003/0155814 | A1 | 8/2003 | Gronbach | |
| 2005/0068017 | A1 | 3/2005 | Lipcsei | |

FOREIGN PATENT DOCUMENTS

| | | |
|---|---|---|
| DE | 10110615 | 9/2002 |
| DE | 10119985 | 10/2002 |
| JP | 5-126870 | 5/1993 |
| JP | 8-228475 | 9/1996 |

OTHER PUBLICATIONS

International Search Report, PCT International Patent Application No. PCT/EP2008/061799, dated Apr. 3, 2009.
Dawson FP: "DC-DC Converter Interphase Transformer Design Considerations: Volt-Seconds Balancing" IEEE Transactions on Magnetics, IEEE Service Center, NY, NY US, vol. 26, No. 5, Sep. 1, 1990 pp. 2250-2252, XP000150516, ISSN: 0018-9464.
Xudong Huang et al.: "A DSP based controller for high-power interleaved boost converters" APEC 2003, 18th Annual IEEE Applied Power Electronics Conference and Exposition, Miami Beach, FL, Feb. 9-13, 20003; [Annual Applied Power Electronics Conference], NY, NY: IEEE, US, vol. 1, Feb. 9, 2003 pp. 327-333, XP010631530 ISBN: 978-0-7803-7768-4.

* cited by examiner

*Primary Examiner* — Jessica Han
(74) *Attorney, Agent, or Firm* — Kenyon & Kenyon LLP

(57) ABSTRACT

A multiphase DC to DC voltage converter which has multiple converter cells which are situated parallel to one another and are clocked with a time offset. Furthermore, it contains one magnetic measuring bridge between the outputs of each two converter cells.

5 Claims, 4 Drawing Sheets

MULTIPHASE DC TO DC VOLTAGE CONVERTER

FIELD OF THE INVENTION

The present invention relates to a multiphase DC to DC voltage converter.

BACKGROUND INFORMATION

A method for generating control pulses for power semiconductors, in particular for the purpose of generating offset control pulses for half-bridges which are coupled to multiphase converters or to DC to DC voltage converters, is described in German Patent Application No. DE 101 10 615 A1. In this method, the reference voltage is displaced by a delay time corresponding to the staggerings or a PWM signal is displaced by a delay time which corresponds to the period divided by the number of offsets.

A device for supplying power to a multi-voltage on-board electrical system of a motor vehicle is described in German Patent Application No. DE 101 19 985 A1. This device has a multi-voltage on-board electrical system situated in a motor vehicle which provides at least one first and one second voltage level, each being different from the reference potential. The multi-voltage on-board electrical system is supplied from at least one electrical energy accumulator. Moreover, it has at least one converter for connecting the two voltage levels. Furthermore, a supply arrangement for external power supply into the multi-voltage on-board electrical system is provided. The above-mentioned converter may be implemented in the form of a multiphase converter. In converters of this type, multiple converter cells of lower power are connected in parallel and the power sections are clocked with a time offset. Due to extinction effects, filter modules may be saved here. Multiphase converters of this type make it possible to implement the first converters and the second converters with the existing phases of a single multiphase converter. For this purpose, the phases are divided here into converters with up and down converting functions. The phases are then separated inside the converter via a switch at the input.

High-performance DC to DC voltage converters are needed in future on-board electrical systems in motor vehicles in order to be able to regulate the power flow between different voltage levels. Due to cost, installation space, and weight limitations, such use in the automotive industry requires minimization of the inductivities and capacitances as well as of the number of components overall. These limitations may be met by using multiphase DC to DC voltage converters as DC to DC voltage converters in which the power to be transmitted is distributed to multiple converter cells. If time-offset clocking of the converter cells is used with this principle, then the current ripples in the superimposed output signal partially cancel out each other or are reduced by a substantial value. The frequency of the output signal of the DC to DC voltage converter increases by the number of the converter cells clocked with a time offset compared to the base clock frequency of the converter cells. The output filters of the DC to DC voltage converter may have smaller dimensions due to the smaller ripples and the higher frequency, whereby cost and installation space advantages are achieved.

For efficient utilization of this method, one current sensor must be used for each converter cell to be able to monitor and regulate the respective current ripples. Without such a single phase regulation, the ripples for each phase may have different magnitudes whereby the above-discussed advantage in the superimposition of the output signals is no longer effective. The ripples in the output signal are getting greater and the frequency of the output signal reverts to the same value as the switching frequency of the individual converter cells, whereby the previously mentioned advantages are canceled out again.

SUMMARY

A multiphase DC to DC voltage converter according to an example embodiment of the present invention may have the advantage over the related art in that the number of its current sensors is reduced, whereby the costs of a multiphase DC to DC voltage converter are substantially reduced. These advantages are generally achieved in that more cost-effective components are used instead of cost-intensive individual current sensors, whereby the measuring principle used has reduced accuracy requirements.

According to one specific embodiment which has a particularly simple design, a measuring bridge is provided between the outputs of each two converter cells which has a core on which two windings of identical number of turns wound in opposite directions are applied.

According to another specific embodiment which may have a particularly compact design, a multiphase measuring bridge is provided which has a closed core over which all individual strands of the multiphase DC to DC voltage converter are guided.

Further advantageous characteristics of the present invention arise from the exemplary description based on the figures.

DETAILED DESCRIPTION OF EXAMPLE EMBODIMENTS

Figure 1:
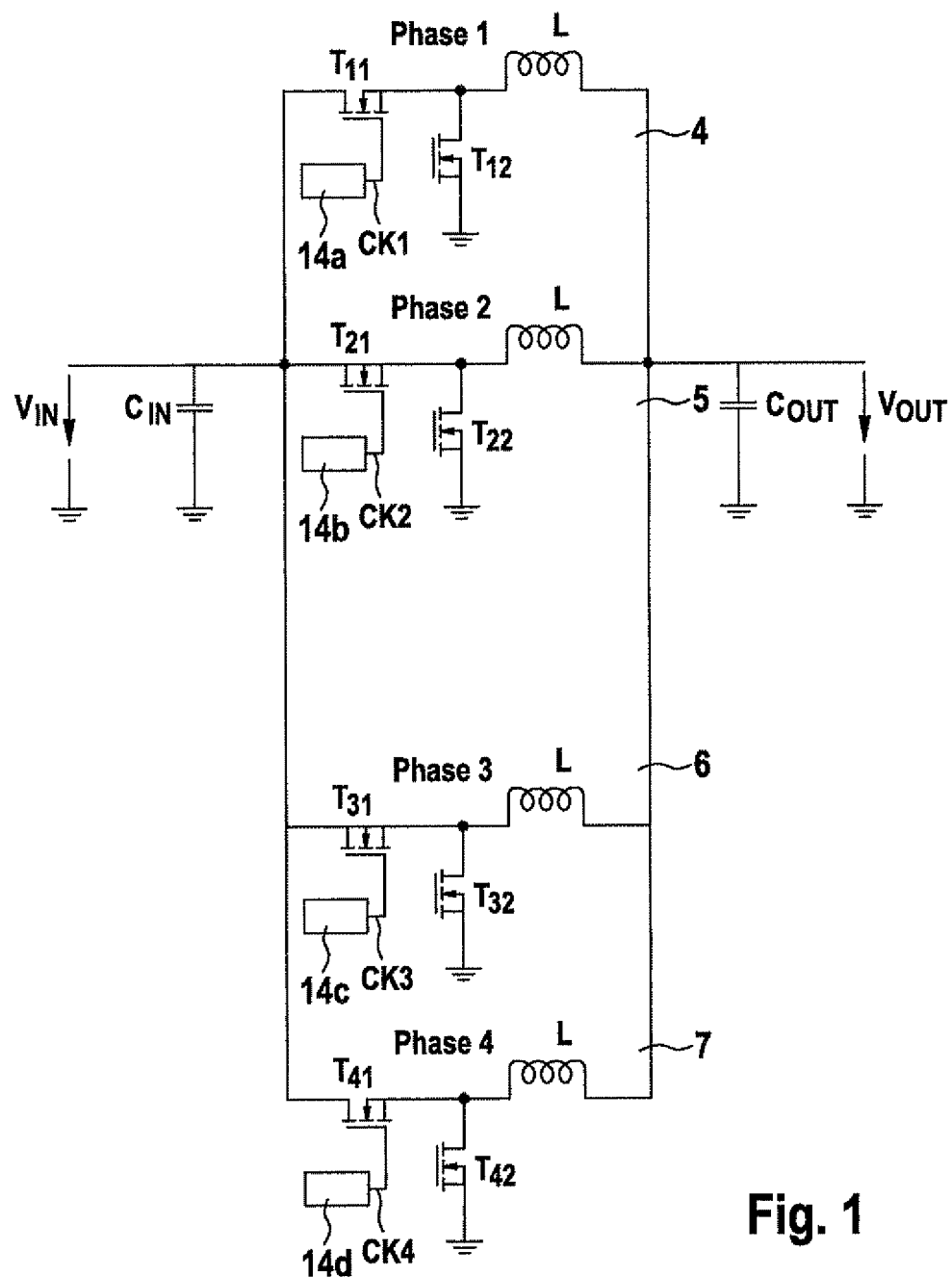
FIG. 1 shows a wiring diagram from which the basic design of the converter cells of a multiphase DC to DC voltage converter is apparent.

FIG. 1 shows a wiring diagram from which the basic design of the converter cells of a multiphase DC to DC voltage converter is apparent. This diagram shows that input voltage $V_{IN}$ is applied to the input terminal via a low pass filter, which has a capacitor $C_{IN}$ connected to ground, for example, to a parallel circuit of n converter cells, four converter cells in the shown exemplary embodiment. These converter cells are clocked with a time offset. A phase 1 is assigned to converter cell 4, a phase 2 is assigned to converter cell 5, a phase 3 is assigned to converter cell 6, and a phase 4 is assigned to converter cell 7.

Converter cell 4 has a transistor $T_{11}$, which is connected to the input of the parallel circuit and connected to the output of a PWM generator 14a, a transistor $T_{12}$, and a coil L. The first terminal of coil L is connected to the interconnection point between the two transistors $T_{11}$ and $T_{12}$. The other terminal of coil L is connected to the output of the parallel circuit. Converter cell 5 has a transistor $T_{21}$, which is connected to the output of a PWM generator 14b, a transistor $T_{22}$, and a coil L. The first terminal of coil L is connected to the interconnection point between the two transistors $T_{21}$ and $T_{22}$. The other terminal of coil L is connected to the output of the parallel circuit. Converter cell 6 has a transistor $T_{31}$, which is connected to the input of the parallel circuit and connected to the output of a PWM generator 14c, a transistor $T_{32}$, and a coil L. The first terminal of coil L is connected to the interconnection point between the two transistors $T_{31}$ and $T_{32}$. The other terminal of coil L is connected to the output of the parallel circuit. Converter cell 7 has a transistor $T_{41}$, which is connected to the input of the parallel circuit and to the output of a PWM generator 14d, a transistor $T_{42}$, and a coil L. The first terminal of coil L is connected to the interconnection point between the two transistors $T_{41}$ and $T_{42}$. The other terminal of coil L is connected to the output of the parallel circuit.

The output of the parallel circuit is connected to the output terminal \$T_{OUT}$ of the multiphase DC to DC voltage converter via an output filter which has a capacitor $C_{OUT}$ connected to ground.

Due to clocking of transistors $T_{11}$, $T_{21}$, $T_{31}$, and $T_{41}$ with a time offset by the clock signals provided by PWM generators 14a, 14b, 14c, 14d, converter cells 4, 5, 6, 7 of the multiphase DC to DC voltage converter are activated at different times. The current ripples in the superimposed output signal thereby cancel out each other partially or are reduced by a substantial value. Compared to the base clock frequency, the frequency of the output signal of the DC to DC voltage converter is increased by the number of the converter cells clocked with a time offset.

According to an example embodiment of the present invention, magnetic measuring bridges are used between the outputs of each two converter cells in order to equalize the currents flowing in the converter cells to one another in order to ensure the advantages of the current ripples canceling out each other during operation of the multiphase DC to DC voltage converter. This is explained below in greater detail based on FIGS. 2 through 5.

Figure 2:
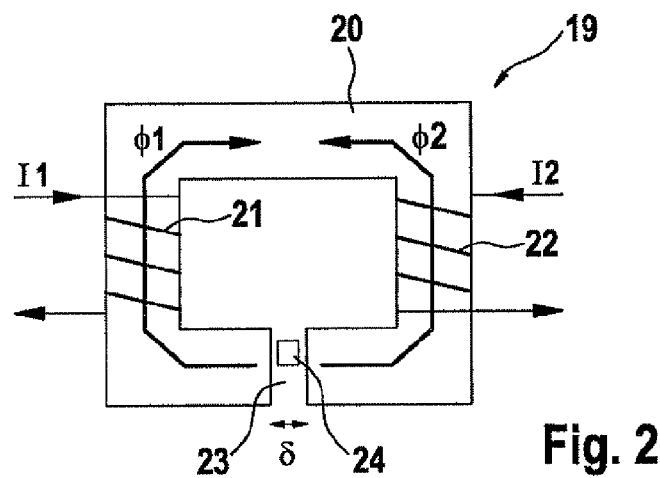
FIG. 2 schematically shows a magnetic measuring bridge.

FIG. 2 schematically shows a magnetic measuring bridge as it may be used in accordance with the present invention. The illustrated measuring bridge 19 has a core 20 on which two windings 21, 22 of an identical number of turns wound in opposite directions are applied. A current I1 flows through winding 21 which is the output current of converter cell 4, for example. A current I2 flows through winding 22 which is the output current of converter cell 5, for example. The respective magnetic flux densities are labeled with φ1 and φ2. A Hall sensor 24 is provided in air gap 23 of core 20 which measures the magnetic flux density.

If there are different DC components, then a magnetic unidirectional flux is generated in the core whose direction is a function of the sign of the current difference. The flux density occurring thereby is mapped on a voltage by the Hall sensor which, for the purpose of its analysis, is supplied to a control system via an A/D converter.

With the aid of such a measuring bridge, a difference signal is detected between the two bridge branches and a readjustment takes place in the sense that this difference becomes zero. No extreme accuracy or linearity is needed for detecting this difference. It is sufficient to recognize that different currents are present so that the currents may be equalized by a readjustment.

If there are a total of n converter cells, then n−1 measuring bridges are needed in order to symmetricize the entire system, i.e., to equalize the output currents of all n converter cells. However, if an additional measuring bridge is added between the output of the nth converter cell and the output of the first converter cell, then the system is overdetermined. Due to the then created cyclical structure it is ensured that in the event of a failure of one converter cell or one measuring bridge the symmetry may still be maintained. Since the windings of the measuring bridges from converter cell to converter cell are each wound in opposite directions, a cyclical structure only exists when the converter cells are even-numbered.

Figure 3:
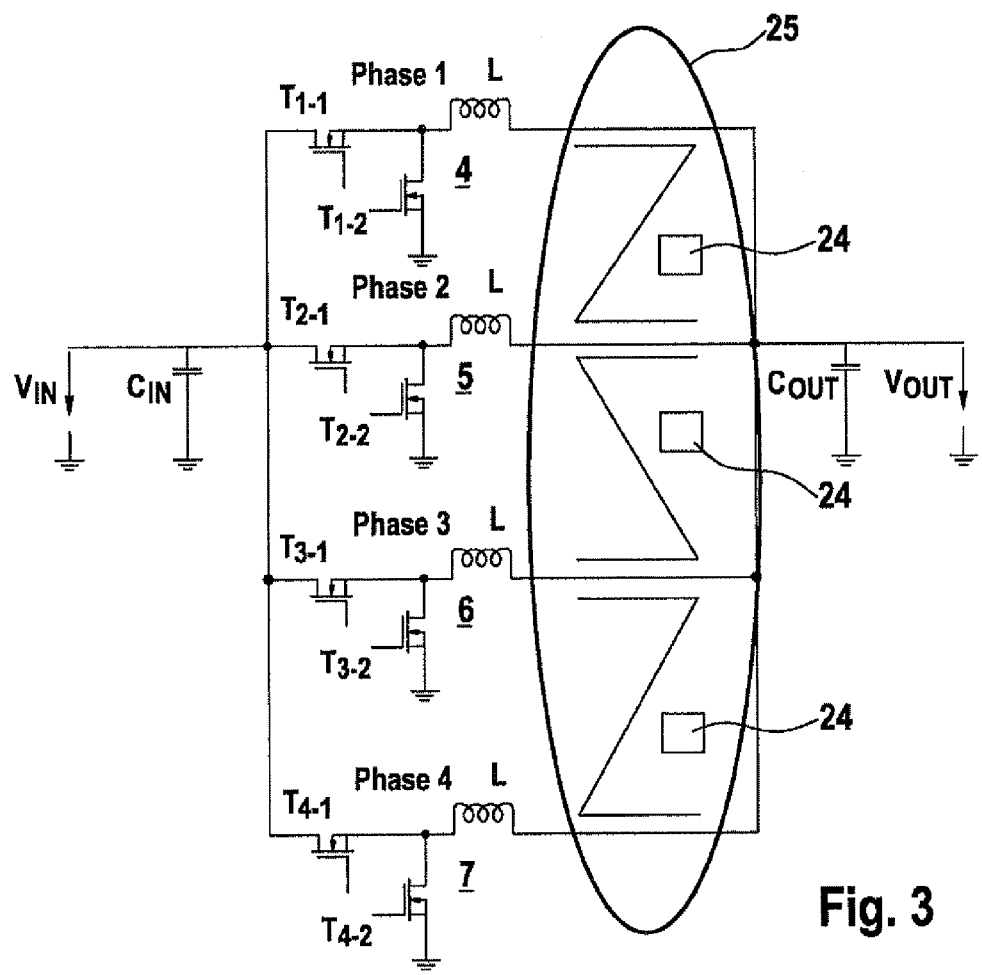
FIG. 3 shows a diagram of a four-phase DC to DC voltage converter having a multiphase magnetic measuring bridge.

FIG. 3 shows a diagram of a four-phase DC to DC voltage converter in which the measuring bridges are implemented in the form of one multiphase measuring bridge 25. The multiphase measuring bridge is depicted here only schematically. It is apparent that the output signals of the four converter cells in total are supplied to the inputs of this multiphase measuring bridge 25. It is furthermore apparent that multiphase measuring bridge 25 is positioned between the outputs of the converter cells and the output filter $C_{OUT}$ of the four-phase DC to DC voltage converter. The further configuration of the DC to DC voltage converter shown in FIG. 3 corresponds to the configuration of the DC to DC voltage converter shown in FIG. 1.

Figure 4:
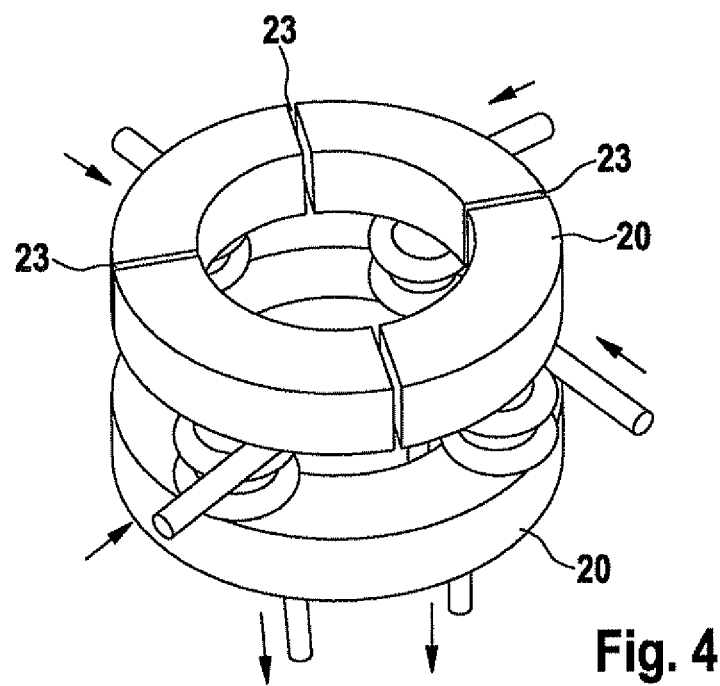
FIG. 4 schematically shows a compact multiphase magnetic measuring bridge.

FIG. 4 schematically shows the configuration of such a multiphase measuring bridge which has a compact structure. This measuring bridge has a single core 20 over which the output phases of all four converter cells pass. The tolerances of the four air gaps 23 influence the amplification in the individual measuring circuits, in particular the zero point of the compensation of the output currents of the converter cells. Therefore, the measuring system must be calibrated with evenly distributed nominal current.

Figure 5:
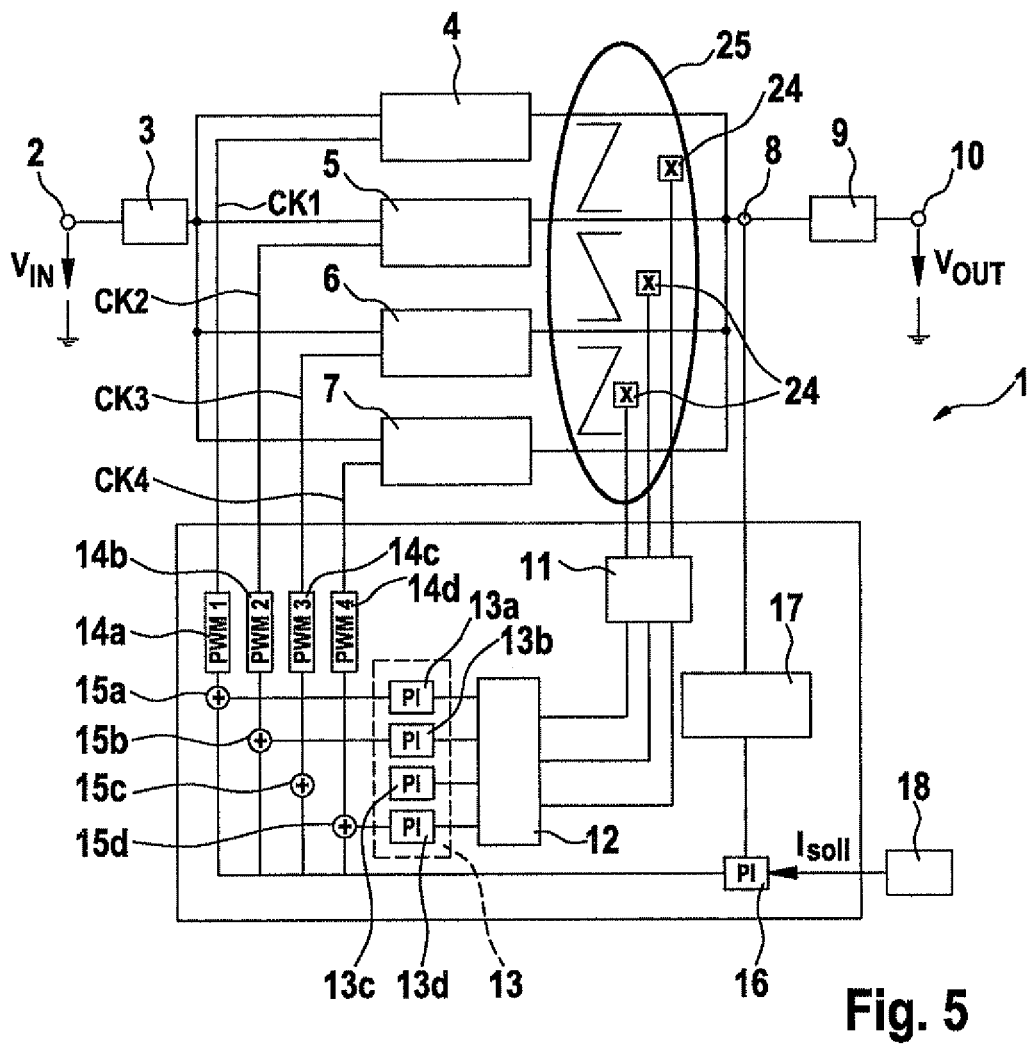
FIG. 5 schematically shows a four-pole DC to DC voltage converter having a multiphase magnetic measuring bridge and an associated control circuit.

FIG. 5 schematically shows the configuration of a four-pole DC to DC voltage converter having a multiphase magnetic measuring bridge and an associated control circuit.

The depicted DC to DC voltage converter 1 has an input terminal 2 to which the input voltage $V_{IN}$ of 42V, for example, is applied. The function of the converter is to convert this input voltage into an output voltage which is 14V, for example. This output voltage $V_{OUT}$ of the converter is provided at an output terminal 10.

The DC to DC voltage converter depicted in FIG. 5 has an input filter 3 connected to input terminal 2, which is a low-pass filter, and which is used to filter out interferences of the input voltage. The output of input filter 3 is connected to a parallel circuit of multiple converter cells 4, 5, 6, 7, the number of the converter cells in the shown exemplary embodiment being 4.

The outputs of converter cells 4, 5, 6, 7 are connected to a multiphase measuring bridge 25 which has the same structure as the multiphase measuring bridge depicted in FIG. 3. The output signals of the converter cells exiting measuring bridge 25 are combined and relayed to output terminal 10 via a current sensor 8 and an output filter 9. Output filter 9 is also a low-pass filter, for example.

The sensor signal from current sensor 8 is relayed to a controller 16 via an A/D converter 17.

Via an A/D converter 11, the signals from Hall sensors 24 of multiphase measuring bridge 25 reach a PWM correction unit 12 whose task is to assign the signals received from A/D converter 11 to the converter cells.

The output signals of PWM correction unit 12 are conveyed to differential current controllers 13a, 13b, 13c, and 13d of a control system 13. This control system provides at its outputs control signals which are used to influence clock signals CK1, CK2, CK3, and CK4 of converter cells 4, 5, 6, and 7.

Differential current controller 13a is assigned to converter cell 4. Therefore, differential current controller 13a provides a control signal assigned to converter cell 4. In an adder 15a, this control signal is superimposed on a control signal of additional controller 16 which is a current controller, for example. A current setpoint value $I_{setpoint}$ provided by a current setpoint value sensor 18 and the current value signal from current sensor 8 and conveyed via A/D converter 17 are supplied to the input side of this current controller 16. The output signal of adder 15a is converted in a PWM generator 14a into a PWM signal which is clock signal CK1 of converter cell 4.

Differential current controller 13b is assigned to converter cell 5. Therefore, differential current controller 13b provides a control signal assigned to converter cell 5. This control signal is superimposed on the control signal of additional controller 16 in an adder 15b. The output signal of adder 15b is converted in a PWM generator 14b into a PWM signal which is clock signal CK2 of converter cell 5.

Differential current controller 13c is assigned to converter cell 6. Therefore, differential current controller 13c provides a control signal assigned to converter cell 6. This control signal is superimposed on the control signal of additional controller 16 in an adder 15c. The output signal of adder 15c is converted in a PWM generator 14c into a PWM signal which is clock signal CK3 of converter cell 6.

Differential current controller 13d is assigned to converter cell 7. Therefore, differential current controller 13d provides a control signal assigned to converter cell 7. This control signal is superimposed on the control signal of additional controller 16 in an adder 15d. The output signal of adder 15d is converted in a PWM generator 14d into a PWM signal which is clock signal CK4 of converter cell 7.

As is apparent from the above explanation, a single-phase current measurement by using a plurality of current sensors is not necessary in a multiphase DC to DC voltage converter according to the present invention. Only a single current sensor 8 is used which is positioned between the outputs of the converter cells and the output filter. Moreover, a magnetic measuring bridge system, also positioned between the outputs of the converter cells and the output filter, is implemented either in the form of multiple individual measuring bridges or in the form of one multiphase measuring bridge. Current differences between each of the adjacent phases may be detected with the aid of this measuring bridge system. The detected current differences are compensated using a control system.

Compared to the use of a single-phase current measurement, in which an individual current sensor is provided in each phase, using a measuring bridge system according to the present invention has the advantage of lower accuracy requirements and the advantage of cost reduction.

Components 11, 12, 13, 14a, 14b, 14c, 14d, 15a, 15b, 15c, 15d, 16, and 17 shown in FIG. 5 may be implemented in the form of a discrete circuit or in the form of a processor.

In the above-described exemplary embodiment, an input voltage of 42V is converted into an output voltage of 14V with the aid of the DC to DC voltage converter. However, the present invention is not restricted to this exemplary embodiment. The input voltage and the output voltage may also have other values. In particular, the input voltage may also be lower than the output voltage.

What is claimed is:

1. A multiphase DC to DC voltage converter, comprising:
a plurality of converter cells which are situated parallel to one another and clocked with a time offset; and
a magnetic measuring bridge between outputs of each two of the converter cells;
wherein one of the measuring bridges has a core on which two windings having an identical number of turns wound in opposite directions are installed;
wherein the core has an air gap in which a Hall sensor is positioned;
wherein the Hall sensor is connected to a control system via an A/D converter, the control system providing control signals which influence clock signals of the converter cells on an output side; and
wherein the control system has multiple controllers which are situated parallel to one another, each being assigned to one of the converter cells and outputs of the controllers being each connected to a corresponding PWM generator via an adder.

2. The multiphase DC to DC voltage converter as recited in claim 1, wherein the adders are each connected to a same output of an additional controller.

3. The multiphase DC to DC voltage converter as recited in claim 2, wherein the additional controller is one of a current controller or a voltage controller, and a first input of the additional controller is connected to a setpoint value sensor.

4. The multiphase DC to DC voltage converter as recited in claim 3, wherein a second input of the additional controller is connected to one of a current sensor or a voltage sensor, via an additional A/D converter and the one of the current sensor or voltage sensor is situated between the output of the converter cells and an output terminal of the multiphase DC to DC voltage converter.

5. The multiphase DC to DC voltage converter as recited in claim 1, wherein the measuring bridges are implemented in the form of one multiphase measuring bridge.

* * * * *